Figure 1:
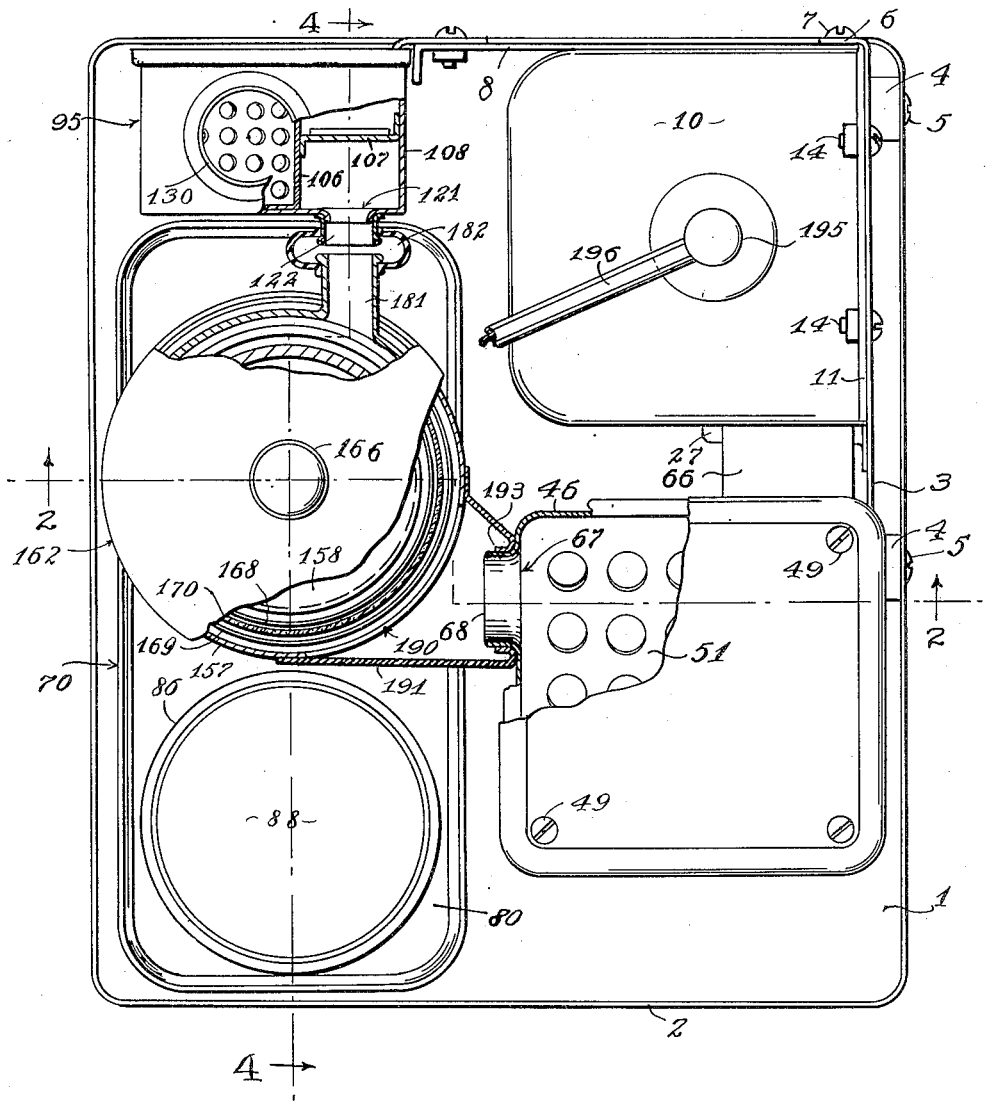

Nov. 7, 1950 L. S. CHADWICK 2,529,137
APPARATUS FOR PRODUCING VAPOROUS OZONIDES
Filed June 30, 1945 7 Sheets-Sheet 1

INVENTOR.
Lee S. Chadwick
BY
Hull & West
ATTORNEYS

Nov. 7, 1950   L. S. CHADWICK   2,529,137
APPARATUS FOR PRODUCING VAPOROUS OZONIDES
Filed June 30, 1945   7 Sheets-Sheet 6

INVENTOR.
BY Lee S. Chadwick
Hull & West
ATTORNEYS

Nov. 7, 1950 L. S. CHADWICK 2,529,137
APPARATUS FOR PRODUCING VAPOROUS OZONIDES
Filed June 30, 1945 7 Sheets-Sheet 7

INVENTOR.
Lee S. Chadwick
BY
Hull & West
ATTORNEYS

Patented Nov. 7, 1950

2,529,137

UNITED STATES PATENT OFFICE 2,529,137

APPARATUS FOR PRODUCING VAPOROUS OZONIDES

Lee S. Chadwick, Shaker Heights, Ohio, assignor to Perfection Stove Company, Cleveland, Ohio, a corporation of Ohio Application June 30, 1945, Serial No. 602,596

12 Claims. (Cl. 21—74)

This invention has to do with improvements in that class of machines or apparatus used for therapeutic purposes in producing and administering vaporized ozonides, as by exhausting the same into the atmosphere for inhalation.

The process employed in such machines or apparatus consists in simultaneously vaporizing a volatile substance, such as pinene, and ozonizing atmospheric air or other suitable fluid, and thoroughly commingling the vapors and ozonized fluid and discharging the mixture. The carrying out of this process requires the general combination of an ozone generator, an evaporating tank containing the substance to be vaporized, and a mixing chamber in communication with both the generator and the evaporating tank to the end that a part of the air admitted to the apparatus is conducted through the generator and ozonized and another part is passed through the evaporating tank to be charged with vapor of the volatile substance, the parts being reunited and thoroughly intermingled in the mixing chamber from which they are finally discharged.

While the medicinal benefits of a properly proportioned mixture of the kind thus produced are very generally known, it is also recognized that a preponderance of either of the principal ingredients, especially that of ozone, results in a product that is characterized by an unpleasant odor, is irritating, and, when the ratio of its parts is decidedly unbalanced, is actually harmful.

The primary object of my invention, therefore, is to provide an apparatus or machine of the above mentioned class that produces a properly proportioned vaporized ozonide; that is very simple and convenient of use; that is thoroughly reliable; that requires no special attention over long periods of time, and which, accordingly, may be used with perfect safety and with highly beneficial results in homes and other places by persons inexperienced in the handling of such machines.

Another object is to include in such a machine or apparatus, means for controlling the supply of air or other fluid used for vaporizing purposes and, more particularly, when atmospheric air constitutes such fluid, for automatically stabilizing its temperature regardless of fluctuations in the temperature of the atmosphere, thereby to maintain a mixture of uniform proportions. This is preferably done by means of a thermostatic control which properly apportions heated air and fresh atmospheric air to produce an air supply of the desired temperature to the evaporating tank.

Another object of the invention is to keep the heat generating and/or heat absorbing parts of the ozone generator, such as the electrodes and dielectric, at relatively low temperatures in order to preserve them against deterioration and prevent damage thereto and thus prolong their periods of usefulness, and this is accomplished by admitting a volume of air or other fluid to the ozone generator in excess of that to be ozonized and that used for vaporizing purposes and conducting all of the air in intimate heat exchanging relation to the aforesaid part or parts, the excess air, over and above that ozonized and that used for vaporizing purposes, being vented to the atmosphere. Another related object is to promote vaporization by utilizing for that purpose at least a part of the air or fluid thus heated.

A further object of the invention is the production of an ozone generator of such simple construction that assembly, disassembly and replacement of parts are greatly facilitated and require the minimum of time, the parts desirably interlocking in such fashion that they are held in assembled condition by a single fastening means.

A still further object of the invention is the provision of a highly efficient mixing chamber for the ozonized fluid and the pinene or other vapor; a further object being to combine therewith a receptacle for recovering a by-product of the mixture and which receptacle may be very easily and quickly emplaced and removed.

A further object comprehended by the invention is the provision of a vaporizing tank of relatively small compass but large vaporizing capacity.

Another object is to provide a construction for a machine or apparatus of the class referred to that involves interchangeable parts whereby the inclusion of an air treating or conditioning unit is optional, so that atmospheric air, supplied by a blower or the like, may be delivered directly to the ozone generator, or to said generator through an intervening air treating or conditioning unit.

Figure 2:
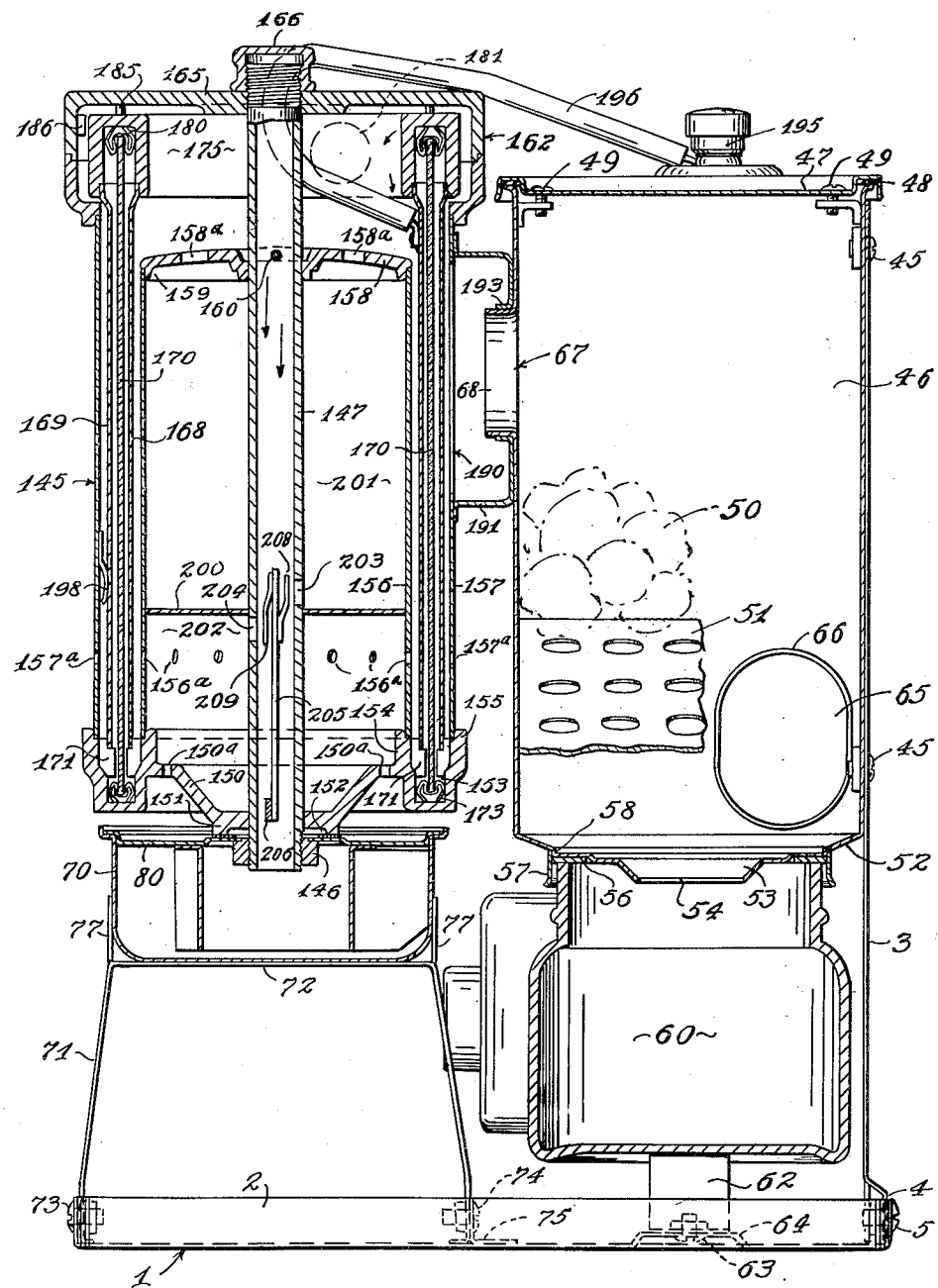
Figure 3:
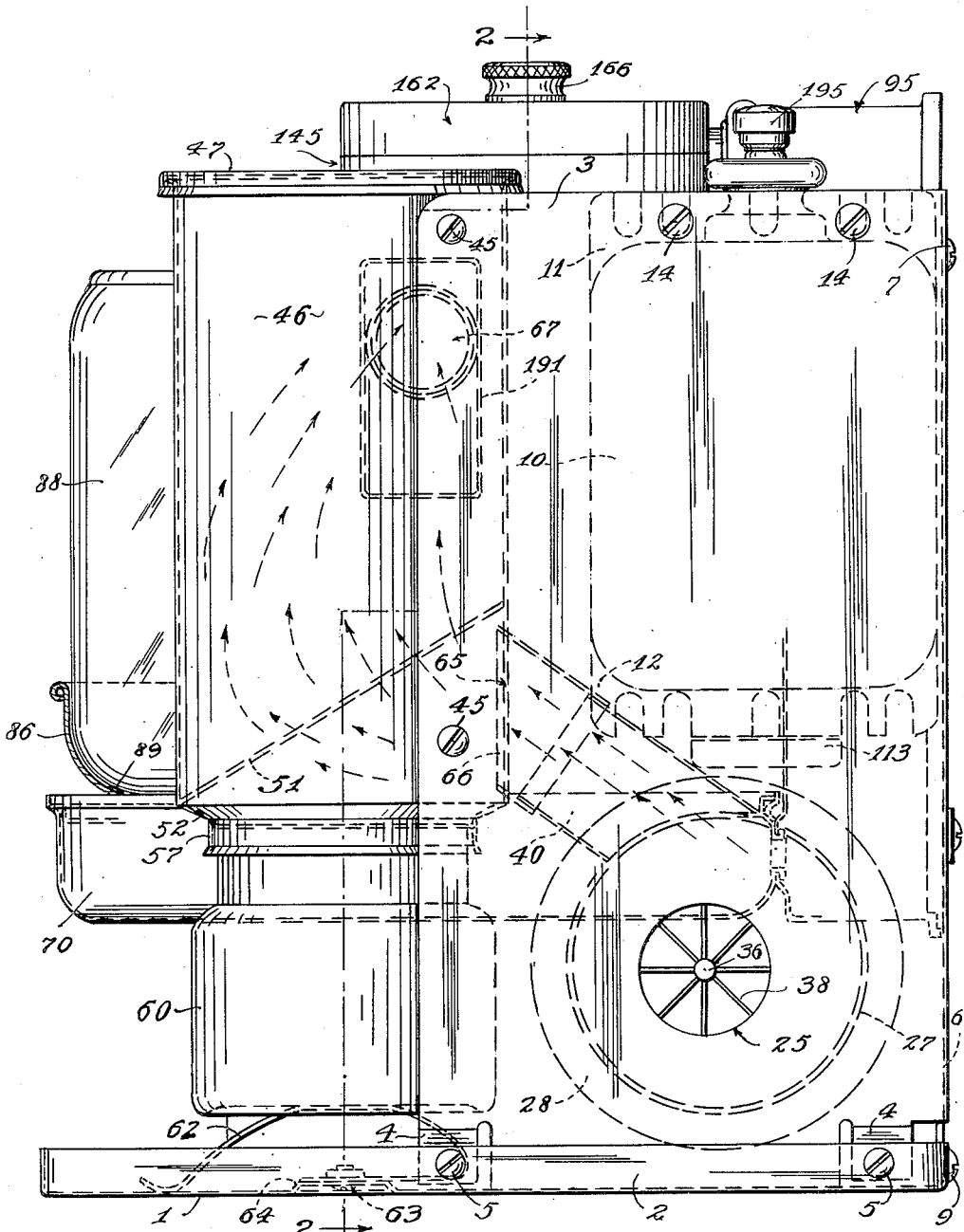
Figure 4:
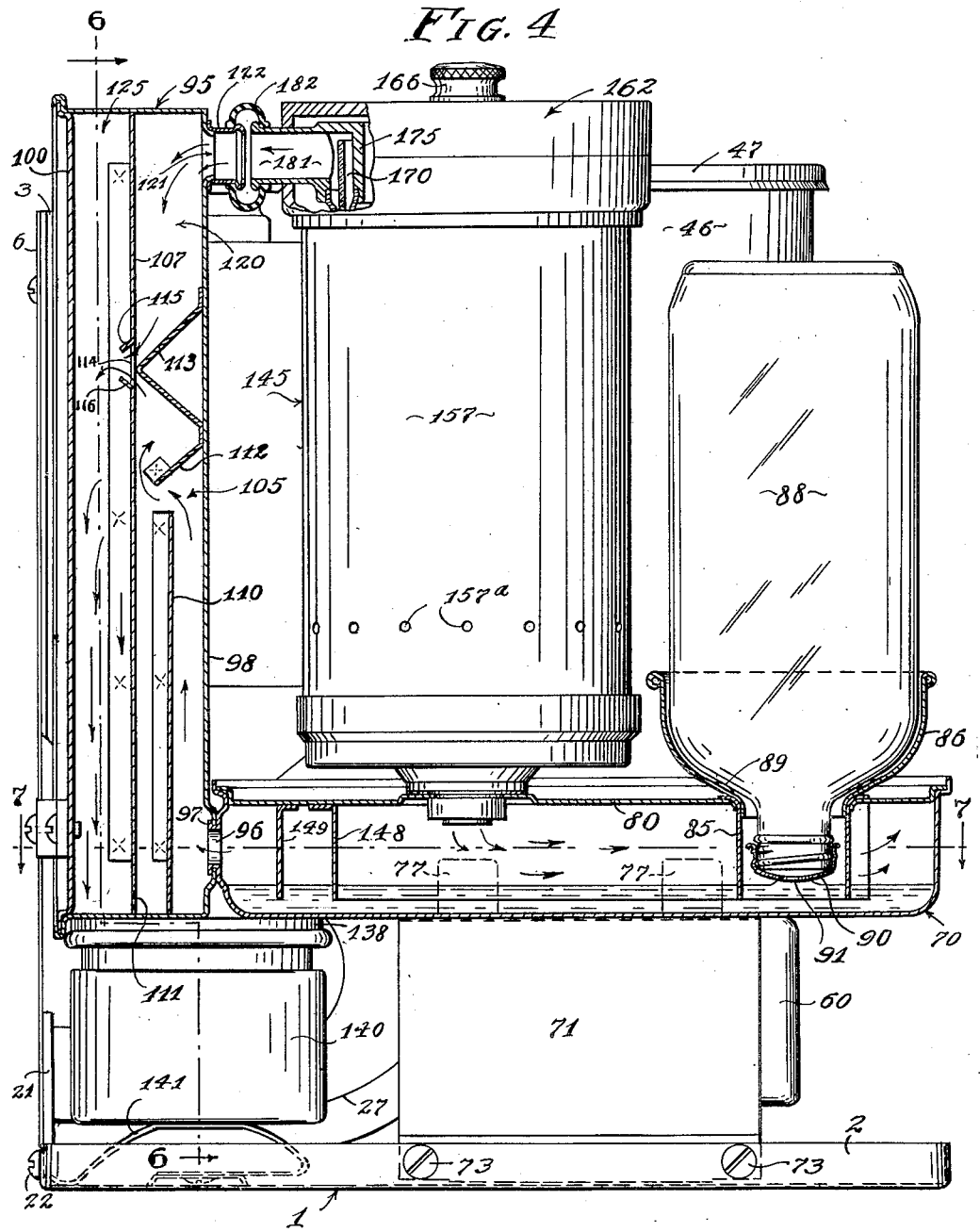
Figure 5:
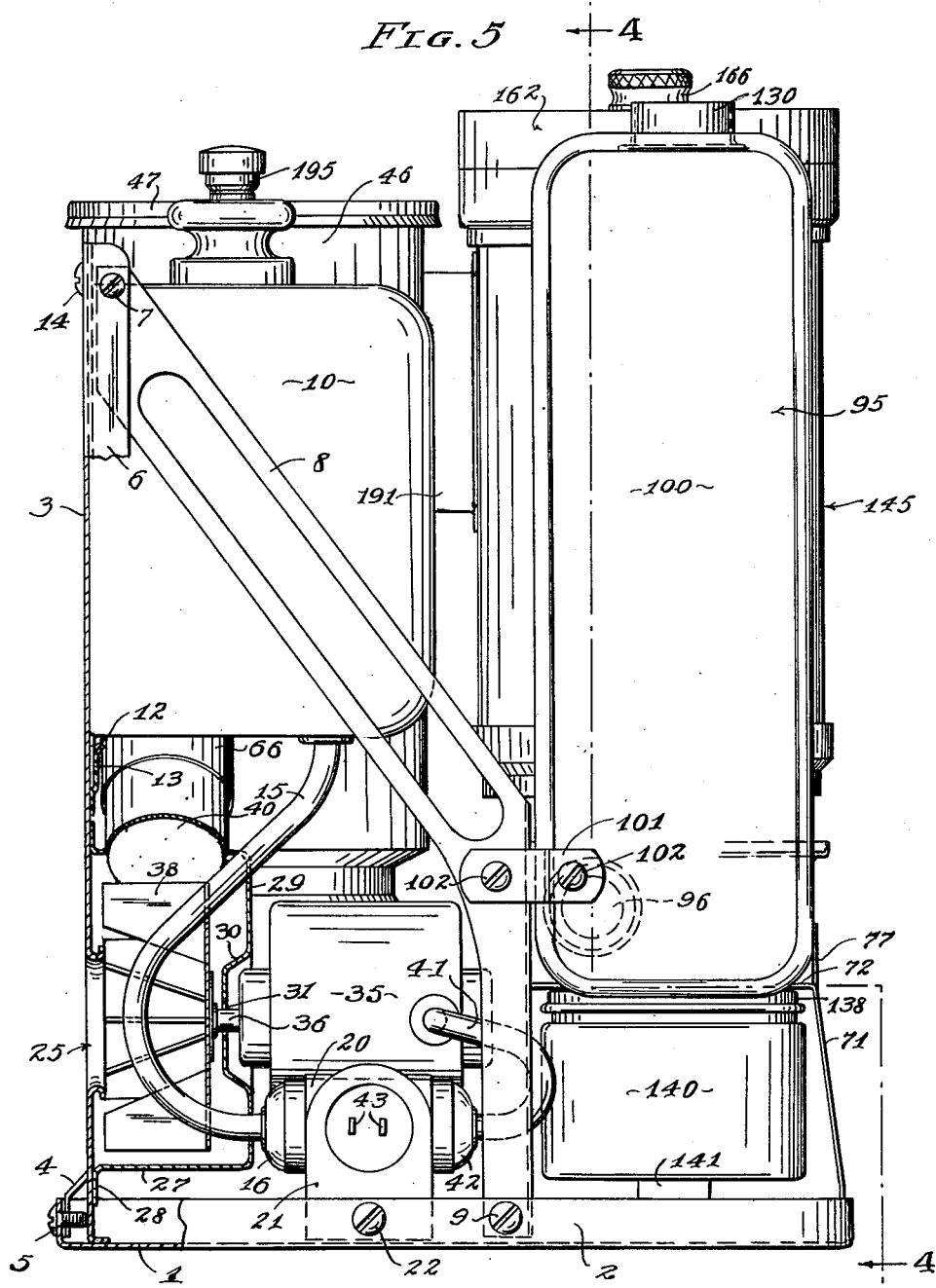
Figure 6:
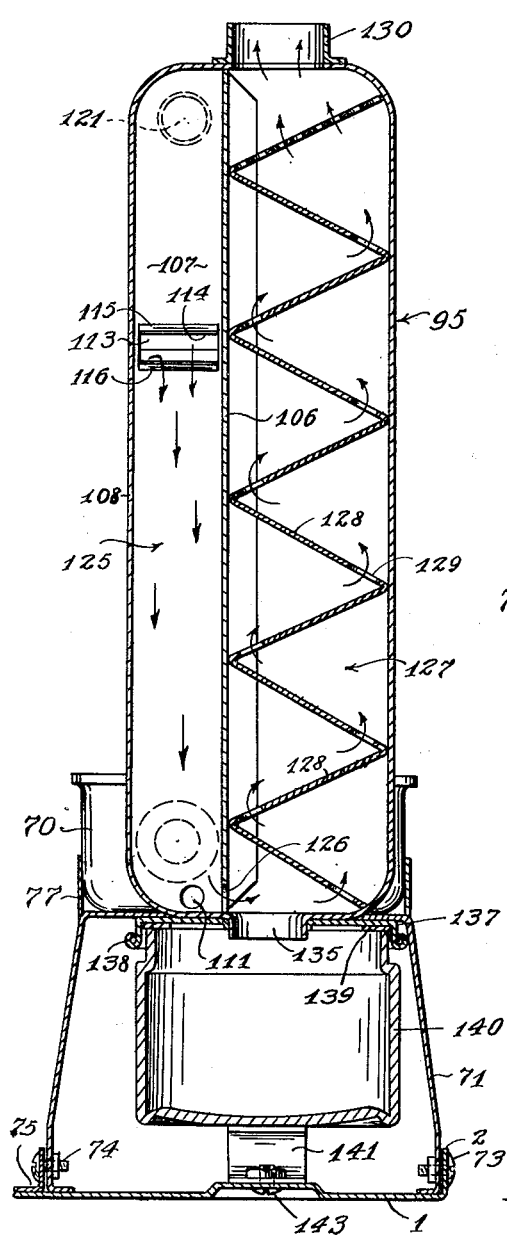
Figure 7:
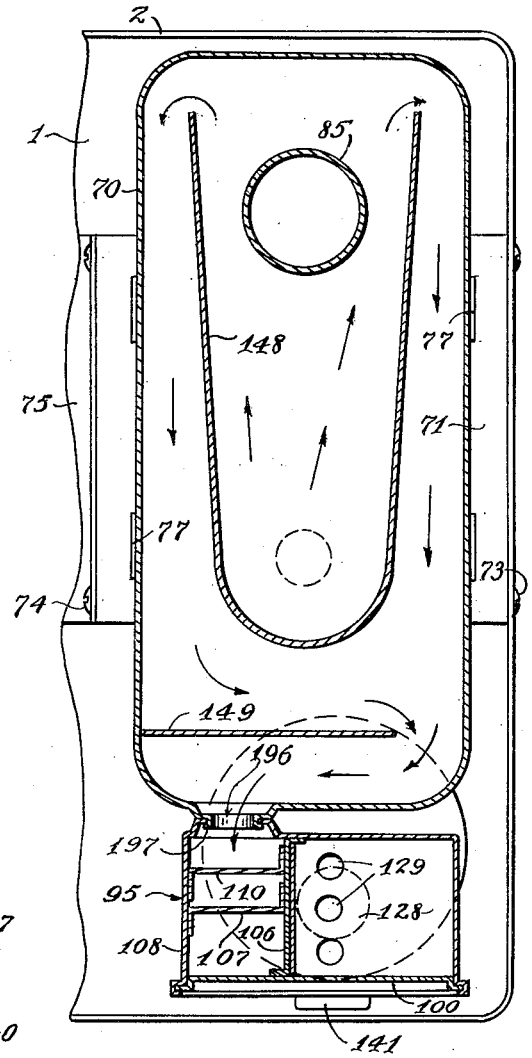
Figure 8:
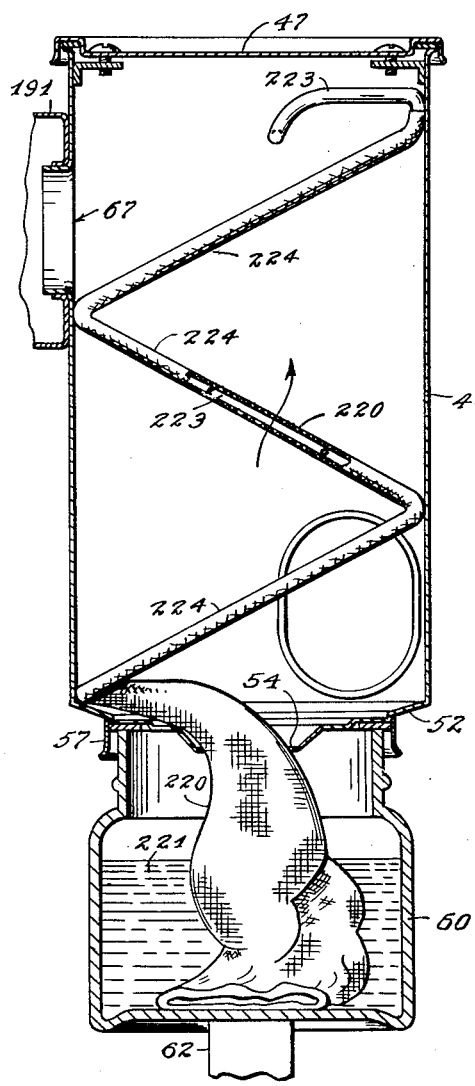
Figure 9:
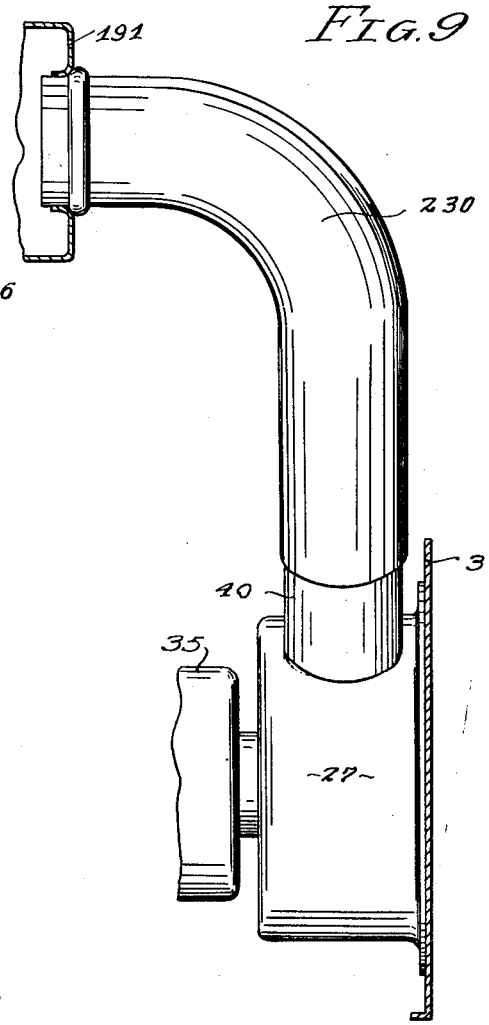

The foregoing objects and advantages, with others that will appear as this description proceeds, are attained in the embodiment of the invention illustrated in the accompanying drawings, wherein Fig. 1 is a plan view of the apparatus with parts broken away; Fig. 2 is a vertical section substantially on the lines 2—2 of Figs. 1 and 3; Fig. 3 is an elevational view as though looking from the right of Figs. 1 and 2; Fig. 4 is a vertical section through the apparatus, substantially on the lines 4—4 of Figs. 1 and 5; Fig. 5 is an elevational view of the apparatus, with parts broken away and as viewed from above Fig. 1; Fig. 6 is a vertical section through the mixing chamber, substantially on the line 6—6 of Fig. 4; Fig. 7 is a horizontal section through the evaporating tank and mixing chamber, as indicated by the line 7—7 of Fig. 4; Fig. 8 is a vertical section through the air conditioning unit equipped to add moisture, chemical or other substance to the air, and Fig. 9 is a fragmentary view of the apparatus showing a conduit which is interchangeable with the air conditioning unit and by means of which a direct connection can be made between the air impelling means or blower and the ozone generator casing.

Turning now to a description of the present construction by means of reference characters, but without intent of limiting the invention to the specific details thereof, 1 denotes a base desirably constructed of sheet metal and having an upstanding peripheral flange 2. Rising from the base along a part of one side thereof is a panel 3 having lugs 4 struck laterally from its lower corners, said lugs being fastened, by screws 5, to the adjacent portion of the flange 2. The vertical edge of the panel 3 above the adjacent corner of the base 1 is turned laterally at right angles to provide a stiffening flange 6, and to the upper end of this flange is fastened, by a screw 7, a brace 8. The lower end of the brace is secured, by a screw 9, to a part of the base flange 2 that lies in the vertical plane of the flange 6.

10 is an electrical transformer of conventional design, having flanges 11 and 12 that extend from top and bottom of the transformer casing adjacent a side thereof that is engaged with the panel 3, the flange 12 being held by a clip 13 that is fastened to the panel, while the flange 11 is secured to the panel by bolts 14. Current is supplied to the primary winding of the transformer through a cable 15 that is equipped with the usual type of plug 16, the prongs of which are inserted into a pair of sockets of a common form of three-way connecting block 20 that is supported by a bracket 21. Said bracket is secured to an adjacent part of the peripheral flange of the base by a screw 22.

The panel 3 is provided with an opening 25, surrounded by a curled-in flange, as appears in Fig. 5, and it is through this opening that all air is supplied to the apparatus, as will more fully appear hereinafter. Encompassing this opening 25, on the inner side of the panel 3, is the casing of a blower 27, said casing being cylindrical and having an end flange 28 that is welded or otherwise attached to the panel 3 in slightly eccentric relation to said opening, as shown in dotted lines in Fig. 3. The end of the casing remote from the panel is formed with a circular wall 29 having a reentrant portion 30 provided with an aperture 31 that is substantially concentric with the opening 25.

An electric motor 35 is supported by the base 1 with its shaft 36 projecting through the aforesaid aperture 31, and secured to the motor shaft inside the blower casing 27 is a rotary fan 38. Although the casing 27 is cylindrical, its eccentricity with respect to the fan 38 gives it the effect of a snail-shell casing, and extending from the outlet side thereof is a discharge tube 40. Current is supplied to the motor 35 through a cable 41 equipped with a plug 42, the prongs of which are inserted into a pair of sockets of the three-way connecting block 20. By means of an ordinary extension cord, current may be supplied to the apparatus from the house circuit by attaching the cord to a pair of prongs, designated 43 in Fig. 5, of the connecting block 20.

Fastened by screws 45 to the panel 3 is the rectangular housing 46 of an air conditioning unit—in the present instance, an air drier or dehydrator. A cover 47, equipped with a gasket 48, is drawn down tightly against the top of the housing 46 by screws 49. Attached in this manner, the cover may be readily removed for introducing moisture absorbing material, such as calcium chloride, indicated at 50, into the housing, to be supported by a foraminous partition 51 that is shown in dotted lines in Fig. 3 as supported in an inclined position adjacent the bottom of the housing. The bottom wall 52 of the housing is gradually tapered in steps to a central frusto conical part 53 that surrounds a drain opening 54. To a flat annular portion of said wall, intermediate its outer edge and the drain opening 54, is applied a gasket 56, confined within a ring 57. The lower end of the ring is flared outwardly, while its upper end is fitted to a shoulder 58 of the wall 52 and suitably secured thereto. A container 60, desirably in the form of a jar of standard design, is supported with its mouth pressed against the gasket 56 and within the confines of the ring 57 by a resilient support 62 in the form of a leaf spring. One end of said spring is fastened by a bolt 63 to an elevated part 64 of the base 1 that is substantially in axial alignment with the housing 46, the spring extending laterally from said elevated part a suitable distance in substantially parallel relation to the base and then upwardly and over said elevated part and thence toward the base, the terminal portion of the spring having sliding contact with the base. The part of the spring which contacts the bottom of the container 60 is desirably flattened so as to provide a better seat for the container. Thus yieldingly supported, the container may be readily removed by depressing it so as to lower its upper end below the bottom of the ring 57 and withdrawing it laterally from beneath the same.

The air inlet 65 of the housing 46 is surrounded by a sleeve 66 that fits over the end of the discharge tube 40 of the blower casing 27, said inlet being situated below the elevated side of the inclined foraminous partition 51. On its side opposite the panel 3, and near its upper end, the housing 46 is provided with an air outlet 67 surrounded by a flange or collar 68.

An evaporating tank 70 is supported a substantial distance above the base 1 by a stand 71, preferably formed from a single piece of sheet metal to provide a top 72 on which the tank rests, and downwardly diverging side members, one of which is connected by screws 73 to an adjacent part of the peripheral flange 2 of the base, and the other, by screws 74, to the vertical flange of an angle bar 75, the horizontal flange of which is welded to the base. The tank is connected to the stand 71 by lugs 77 that are secured, as by welding, to the tank and stand.

In the present embodiment of the invention, the evaporating tank 70 is in the nature of a pan and the upper edge of its peripheral wall is flanged outwardly and thence upwardly to receive the elevated flanged edge of a cover 80, the joint between which and the peripheral wall of the tank is permanently sealed as by the parts being brazed or welded together. Near one of its ends the cover 80 is provided with an aperture about which the material of the cover is curled downwardly; and projected through this aperture is a sleeve 85 whose upper end is flared to fit the contour of the cover about said aperture, while its lower end is spaced a relatively short distance from the bottom of the tank. Extending a suitable distance into the top of the sleeve 85 and suitably secured thereto is the lower end of a funnel-like cup 86 that receives the top portion of an inverted dispensing receptacle 88, desirably consisting of a glass bottle. The cup 86 follows the contour of the enclosed portion of the dispensing receptacle, but it is enough larger than said enclosed part to provide an air passage between the receptacle and cup, the former being spaced from the latter by three or more projections 89 on the cup. A cap 90 is secured, as by a screw thread connection, to the mouth of the dispensing receptacle, and said cap is provided with an aperture 91 through which the contents of the receptacle discharge into the tank. It will be apparent from the construction just described that the dispensing receptacle is liquid sealed within the sleeve 85, thereby to establish a liquid level in the tank a distance above the lower end of said sleeve. It is also apparent from the fact that the lower end of the sleeve 85 extends an appreciable distance below said liquid level, that a liquid seal is provided between the air space within said sleeve and the remaining interior of the tank above the liquid level.

An elongated mixing chamber 95, quite similar in construction to the evaporating tank 70, occupies a vertical position beyond the end of the evaporating tank remote from the dispensing receptacle 88 and its lower end, being adjacent the end of the evaporating tank, communicates with said tank through a vapor outlet opening 96 of the latter which is surrounded by a flange 97 that is projected through an aperture in the adjacent vertical wall 98 of the mixing chamber and is flared outwardly on the inner side of said wall to produce an eyelet-like connection between the contacting portions of the walls of the tank and chamber. The open side of the pan-like structure that forms the body portion of the mixing chamber 95 is closed by a wall 100, the edge of which is connected with a fluid-tight joint to the surrounding edge portion of the peripheral wall of the mixing chamber. In order to render more rigid the assembly including the stand 71, the evaporating tank 70, and the mixing chamber 95, the latter is tied, by a link 101 (Figs. 1 and 5) to the brace 8, the opposite ends of said link being fastened to the chamber and brace by screws 102.

As best appears from Figs. 4, 7 and 8, the outlet 96 of the evaporating tank leads into the bottom of a vapor receiving compartment 105 of the mixing chamber 95 which is set off by partitions 106 and 107. These partitions extend from top to bottom of the chamber, the former being disposed between the walls 98 and 100, and the latter between the partition 106 and a side wall 108 of the chamber. A dam 110 rises from the bottom of the mixing chamber a suitable distance within the vapor receiving compartment 105 in parallel relation to the partition 107. The dam serves to trap any liquid which may spill over into the mixing chamber from the evaporating tank in case the apparatus is tilted perceptibly while being moved or handled. The importance of trapping such liquid is apparent from the fact that the partition 107 has a drain opening 111 adjacent its lower end for the escape of residue which, during operation of the apparatus, drips from a baffle 112 and from other adjacent parts into the space between the dam 110 and the partition 107, as will hereinafter more fully appear.

The previously mentioned baffle 112 overhangs the dam 110 and extends downwardly from, and at an angle to, the wall 98; and above said baffle a roof-shaped deflector 113 projects from the wall 98 and has its ridge substantially in contact with the partition 107. According to the present construction, the deflector 113 and baffle 112 are formed from a continuous strip of sheet metal that is connected, as by welding, at suitable points, to the walls 98 and 108 and to the partition 106. In the horizontal plane of the ridge of the deflector 113, the partition 107 is provided with a horizontal slot 114, above and below which are inclined flanges 115 and 116, shown as formed by parts of the partition that are struck from the slot 114. It is to be noted that the flange 115 is spaced somewhat further away from the deflector 113 than is the flange 116, thereby to control and better proportion the ozonized fluid and pinene vapors, as will more fully appear hereinafter. The space above the deflector 113 is the ozone receiving compartment 120 of the mixing chamber, and the inlet opening 121 of said compartment is made in the wall 98 and is surrounded by a neck 122. A circumferential bead extends about the outer end of said neck.

The vapor and ozone receiving compartments 105 and 120, respectively, communicate, through the slot 114, with a compounding passage 125 which, in turn, communicates at its lower end, through an opening or openings 126 in the partition 106, with a commingling compartment 127. This compartment is converted into a tortuous passageway by a series of reversely inclined partitions 128, all of which, excepting the top one, have one or more openings 129 adjacent their respective lower edges. The top partition 128 is desirably perforated throughout its entire area. According to the present construction, the partitions 128 are formed by parts of a continuous zig-zag strip of sheet metal. The top wall of the mixing chamber has an outlet opening that leads from the commingling compartment 127, said opening being surrounded by a flanged collar 130, the flange of which is suitably attached to the chamber wall. In practice, a discharge spout (not shown) is applied to the collar 130 through which the products of the apparatus are exhausted into the atmosphere.

A drain opening 135 is formed in the bottom wall of the mixing chamber, the material of said wall being flanged downwardly about said opening; and a circular plate 137, having an eccentrically disposed hole, is engaged upwardly over the flange and is attached, as by welding, to the bottom wall of the chamber. The plate 137 has a depending rim 138 within which is confined an annular gasket 139. A drip cup 140, which may be in the form of a glass jar of standard design, is yieldingly held by means of a spring support 141 with its mouth pressed against the gasket 139. The support 141 is substantially identical with the previously described spring support 62, and is attached to an elevated portion of the base by a bolt 143.

Surmounting the evaporating tank and located alongside the mixing chamber is the ozone generator designated generally by the reference numeral 145, the construction of which is best shown in Figs. 1 and 2. Locked within an aperture of the cover 80 of the evaporating tank 70 is an internally threaded boss 146 into which is screwed the lower threaded end of a hollow column 147 about which the parts of the ozone generator are assembled. It may be mentioned in passing, although it will be more fully explained hereinafter, that fluid or air is delivered to the evaporating tank through the column 147, and in order to expose the maximum area of the liquid in said tank to the fluid or air before it escapes through the vapor outlet 96, the fluid or air is diffused by means of baffles 148 and 149 that are attached to and depend from the cover 80 to within a short distance of the bottom of the tank, or well below the liquid level therein, the lower edges of said baffles being in substantially the same plane as the lower end of the beforementioned sleeve 85.

Surrounding the lower end of the column 147 is a circular bottom unit 150 having an annular base flange 151 that bears, through a similarly shaped pad 152, on a slightly elevated part of the cover 80. A portion of the unit 150, outwardly beyond the flange 151, is frusto conical and the peripheral portion of said unit is enlarged vertically and contains an upwardly facing channel 153. The inner and outer walls 154 and 155 of the channel are spaced further apart at the top than they are at the bottom of the channel, and formed on the inner sides of said walls adjacent their upper edges are annular seats wherewith are engaged the lower ends of inner and outer cylindrical casing walls 156 and 157, respectively. These casing walls are made of suitable metal and are provided a short distance above their lower ends with series of vent apertures, those of the respective inner and outer walls being designated 156a and 157a. Applied to the top of the inner wall 156 is a circular partition 158, having openings 158a, the partition being properly positioned with respect to said wall by a depending flange 159. A cross pin 160 is extended through diametrically opposed holes in the column 147 and has its ends confined within a central depression of said partition and with the partition thus held downwardly on the column 147 the wall 156 is held depressed against the seat upon which it bears.

Fitted over the top of the outer cylindrical wall 157 is the flanged rim of a two-part cap or top unit 162, the parts whereof separate in substantially the central horizontal plane of the unit. The mating edges of the two parts are formed with interfitting flanges to more effectively close the joint between said parts. Projecting through a central aperture in the circular top wall 165 of the unit 162 is the threaded upper end of the column 147, and applied to said end is a screw cap 166 that bears against said wall and presses the entire assembly surrounding the column downwardly against the cover of the evaporating tank.

Disposed between the inner and outer cylindrical casing walls 156 and 157, in substantially concentric spaced relation thereto and to one another, are inner and outer tubular electrodes 168 and 169, respectively, and, intermediate the two electrodes, a dielectric 170. According to my present preference, stainless steel is used for the electrodes, and a quality of glass, generally known by the trade name "Pyrex," for the dielectric. The electrodes bear at their lower ends on a plurality of lugs 171 that are spaced apart about the channel 153 and are carried by the inner and outer walls thereof, the upper ends of said lugs being notched to provide seats for the electrodes. The dielectric extends a substantial distance below the lower ends of the electrodes and is yieldingly supported by a suitable number of resilient clips 173 that are distributed about the channel 153 and rest on the bottom wall thereof and serve to sustain the dielectric substantially equally spaced from the two electrodes.

A header 175, in the form of a downwardly opening annular channel, is applied to the upper ends of the electrodes and dielectric. The outer electrode 169 is flared adjacent its upper end and seats within the rabbeted lower edge of the outer wall of the header 175, while the upper end of the inner electrode is contracted and seats within the rabbeted lower edge of the inner wall of the header. The dielectric extends well above the tops of the electrodes and is yieldingly located substantially centrally within the channel of the header by a series of resilient clips 180. The header is provided with a lateral outlet extension 181 (Figs. 1, 2 and 4) that projects through an aperture that is divided between the two parts of the top unit 162 and is approximately aligned with the neck 122 that surrounds the ozone inlet 121 of the mixing chamber. A fluid tight joint between said extension 181 and the neck is made by a coupling 182 of resilient material, such as natural or synthetic rubber. The ends of the coupling, when stretched over the circumferentially beaded ends of the extension and neck, contract and snugly fit about said parts. The header 175 is spaced from the top wall 165 of the unit 162 by lugs 185 on the header, and from the peripheral wall of said unit by lugs 186 that extend inwardly from the last mentioned wall.

Air is admitted to the casing of the ozone generator from the housing 46 of the air conditioning unit through a relatively large opening 190 in the outer casing wall 157. The flared end of a fitting 191 is welded or otherwise secured to said wall 157 about the opening 190, while its end remote from said wall is provided with an opening surrounded by a flange 193 into which the flange or collar 68 of the housing 46 snugly fits.

It may be explained, though not illustrated, that one terminal of the secondary winding of the transformer 10 is grounded. The other terminal, represented by the binding post 195, is electrically connected, through a conductor 196, with the inner electrode 168 of the ozone generator, said conductor entering the casing of the generator through a hole in the top wall of the unit 162. The outer electrode 169 is grounded through a spring finger 198 of suitable metal that is carried by the outer casing wall 145 and bears against said electrode. An annular partition 200 divides the space that is enclosed by the inner casing wall 156 (in conjunction with the bottom unit 150 and the previously mentioned partition 158) into a cool air chamber 201 and a warm air chamber 202. The interior of the hollow column 147 communicates with the cool air chamber 201 through a port 203 in the wall of said column, and with the warm air chamber 202 through a port 204. A thermostatic element 205, in the form of a bimetal strip, is carried by a bar 206 that extends across and is supported by the column. Valves or shutters 208 and 209 are carried by the bimetal strip near the free end thereof and are arranged to cooperate with the respective ports 203 and 204. Under the influence of abnormally cool air, the bimetal strip warps in a direction to move the valve or shutter 208 toward the port 203, and, under the influence of warm air, in a direction to move the valve or shutter 209 toward the port 204.

For appearance and protection, the apparatus above described is intended to occupy a casing (not shown), and, with the casing, is portable and of a size and weight permitting it to be conveniently handled. The casing, it may be explained, is constructed to provide ample ventilation, and it has openings in its wall registering, respectively, with the air inlet of the apparatus, and with the outlet for its products, and others affording access to certain of its parts. In use, air may be admitted directly from the room in which the apparatus is located through the opening 25, or, as is quite common with apparatus of this class, a conduit or hose may have one of its ends in register with or projected through the air inlet 25, while its opposite end is arranged to receive outdoor air, as by having it projected through a panel that may be placed within a window and engaged by the sash thereof, in the manner of a common type of ventilator.

In preparing the apparatus for use, the dispensing receptacle 88, containing pinene or other liquid, with the vapors of which the ozonized fluid or air is to be charged, is placed in inverted position in the cup 86 so as to maintain a body of the liquid in the evaporating tank 70 to the level indicated in Figs. 2 and 4, and a quantity of calcium chloride or other drying agent is placed in the housing 46.

Now, by means of an extension cord, as hereinbefore explained, current is led from the house circuit to the connecting block 20 and thence to the motor 35 to energize it and drive the fan 38 of the blower. Current is likewise supplied to the transformer 10. Air drawn in through the opening 25 is forced through the housing 46 of the air conditioning unit to be dehydrated more or less by the action of the drying agent 50 that is supported within the housing by the foraminous partition 51. Moisture extracted from the air drains through the opening 54 into the container 60, from which it may be removed from time to time in a manner already described.

The air passes from the housing 46 through the outlet 67 thereof and through the opening 190 into the interior of the ozone generator casing. A part of the air flows upwardly within the annular space between the outer casing wall 157 and the adjacent electrode 169 and finds its way about the header 175, located within but spaced from the walls of the top unit 162, the air continuing downwardly between the inner casing wall 156 and the adjacent electrode 168. Some of this air enters the cool air chamber 201 through the openings 158ª in the partition 158. The remainder of the air entering through the opening 190 descends within the annular space first above mentioned and flows into the channel 153 of the bottom unit 150 and thence upwardly through the ozone generating space between the outer electrode 169 and the dielectric 170. Some of this downwardly flowing air may pass around the lower end of the dielectric and join the air descending between the inner electrode 168 and the adjacent casing wall 156 to ascend therewith through the ozone generating space between the inner electrode and the dielectric. The ozone generated in the spaces on opposite sides of the dielectric 170 is collected within the header 175 from which it passes through the extension 181 and neck 122 into the ozone receiving compartment 120 of the mixing chamber 95.

Attention is called to the fact that all air admitted to the apparatus enters the ozone generator casing. All of this air, or, in any case, a very large percentage of it, serves to cool the heat generating and heat absorbing parts of the apparatus, particularly the electrodes and dielectric. A part of the air, after serving such purpose, escapes to the atmosphere. Another part continues on through the ozone generating spaces, and is ozonized and delivered to the mixing chamber, while the remainder is conducted to the evaporating tank for producing vapors from the volatile liquid therein and, laden with said vapors, passes on to the mixing chamber where it joins the beforementioned ozonized air, the two parts now under consideration being thoroughly intermingled in said chamber and discharged therefrom as a product of the apparatus. A valuable by-product will be mentioned presently.

As brought out in the beginning, it is important that a proper balance be maintained between the main constituents of the vaporized ozonide, and while this may be accomplished in large measure by providing passages of predetermined capacity for the ozonized fluid and vapors, as by the arrangement of the deflector 113 with respect to the slot 114 above described, I promote the desired end in the present embodiment of the invention by employing the beforementioned thermostatic means comprising the bimetal strip 205 and the valves or shutters 208 and 209.

In considering the operation of this automatic control, let it be assumed that the atmospheric temperature is low and that the air entering the ozone generator through the opening 190 is too cold to properly vaporize the liquid in the evaporating tank 70. The air entering the cold air chamber 201 through the openings 158ª passes into the hollow column 147 through the port 203 and strikes the bimetal strip 205. The resultant chilling of the strip causes it to warp in the direction to present the valve or shutter 208 to the port 203 and wholly or partially close the port. In the meantime, air passing downwardly between the inner casing wall 156 and the adjacent electrode 168 is heated and a part of it enters the warm air chamber 202 through the apertures 156ª. Some of this warm air passes through the port 204 into the hollow column 147 and is conducted thereby into the evaporating tank 70, such air being warm enough to vaporize the liquid and, with the vapors, passes on to the mixing chamber. Air admitted to the chamber 202 in excess of that delivered to the evaporating tank escapes to the atmosphere through the openings 150ª.

Under continued operation of the apparatus, the air that is to find its way to the warm air chamber 202 becomes heated to such a degree that unless its temperature were moderated it would produce an over-amount of vapor, causing a preponderance of the pinene or other treatment in the final product. This is avoided by response of the thermostatic means to the overly warm air, the bimetal strip now warping in the reverse direction to that before mentioned, thus opening the port 203 to admit cool air to the column. This cool air, mixing with the heated air, provides a supply to the evaporator tank of a temperature to generate the proper amount of vapor. Any rise in the atmospheric temperature will result in the bimetal strip warping further in the present direction to close or partially close the port 204 and shut down the supply of heated air.

Previous mention has been made of a residue that forms in the mixing chamber, and is a valuable by-product of the apparatus. It is a condensation product and has about the consistency of a very heavy syrup, and it possesses pronounced healing and antiseptic properties. As stated before, the residue which drips from the baffle 112 and deflector 113 and the walls adjacent thereto escapes from the space between the partition 107 and the dam 110 through the opening 111 and, with that collecting in the bottom of the compounding passage 125, flows through the opening or openings 126 at the bottom of the partition 106 and drains through the opening 135 into the drip cup 140. When the cup becomes filled, it may be removed in the manner previously described and emptied and then replaced; or it may be capped to protect its contents and a substitute cup inserted in its place in the apparatus.

Heretofore, it has been generally supposed that air to be ozonized should be dry. This, I have found by experimentation, depends upon the nature of the product that is desired. In fact, for certain treatment, it is believed beneficial to humidify the air; or the air may, to advantage, be chemically treated; or the air may be directly ozonized without any preliminary treatment.

To humidify or chemically treat the air, I alter the air conditioning unit as illustrated in Fig. 8 where a tubular wick 220 has its lower end extended through the opening 54 in the bottom of the housing 46 and disposed in a body of liquid 221 in the container 60. Said liquid may consist of water, or a suitable chemical. Above the bottom wall of the housing, the tubular wick is stretched on a resilient wire frame 223 by which it is supported in zig-zag fashion to provide a number of screens 224 each consisting of two spaced layers, as illustrated by the broken away part of the central screen.

It is evident from the above construction that, through the capillary action of the wick, the liquid will saturate the two layers of the wick material of the screens 224 and will be evaporated by the air that is forced through the screens within the housing and will pass along in the form of vapor with the air as it continues through the outlet 67 of the housing and into the casing of the ozone generator.

For general purposes, when the aparatus is used in the home for charging the air with ozonized pinene vapors, the air conditioning unit may be dispensed with and a direct connection made between the discharge tube 40 of the blower casing 27 and the inlet fitting 191 of the generator casing through a conduit 230, shown in Fig. 9, and which is interchangeable with the air conditioning unit, as will be readily understood.

Having thus described my invention, what I claim is:

1. In apparatus of the class described, the combination of a mixing chamber, an evaporating tank having a vapor outlet communicating with said chamber, an ozone generator comprising a casing having a fluid inlet and a fluid outlet, the latter opening into the evaporating tank, ozone generating elements within the casing arranged to define therewith a passage including a first part in heat exchanging relation to the electrodes and a second part constituting the ozone generating space, means inducing a flow of fluid inwardly through said inlet, means for conducting fluid from the first part of said passage to the aforesaid outlet and thence to the evaporating tank, and means for conducting ozonized fluid from the second part of said passage to the mixing chamber, the mixing chamber having an outlet for the products of the apparatus.

2. In apparatus of the class described, the combination of an evaporating tank, a hollow column opening into said tank, a casing surrounding said column, the column having an opening within the casing whereby the column provides communication between the casing and said evaporating tank, opposed electrodes within the casing and an interposed dielectric so arranged within said casing as to provide a two-branch passage, each branch extending along one face of an electrode and thence about one end and along the other face thereof, the discharge end of said passage serving as an outlet for the ozone, the casing having an air inlet and being provided with a vent for said passage in the region where the aforesaid branch extends about the end of the corresponding electrode, means inducing a flow of air inwardly through said inlet to the adjacent part of the casing from which a portion of the air will pass to the evaporating tank by way of said column and the remainder, with the exception of that escaping through the vent, will pass through said two-branch passage, and a mixing chamber in communication with the evaporator tank and with the discharge end of said passage, the mixing chamber having an outlet for the products of the apparatus.

3. In apparatus of the class described, the combination of an evaporating tank, a hollow column opening into said tank, a casing surrounding said column, the column having an opening within the casing whereby the column provides communication between the casing and said evaporating tank, opposed electrodes of sheet material within the casing and a sheet-material dielectric disposed between and in spaced relation to said electrodes, the casing including walls that are spaced from the inactive faces of the electrodes to provide therewith fresh air passages that join at one end of the electrodes the ozone generating passages between the active faces of the electrodes and the dielectric, a header within the casing adjacent the opposite end of the electrodes, said header enclosing an ozone passageway into which the ozone generating passages open, said header having a discharge connection extending outside the casing, the casing having an air inlet, means inducing a flow of air inwardly through said inlet and through a part of the interior of the casing and said column into the evaporating tank, and through said fresh air passage to the ozone generating passages, and a mixing chamber in communication with the evaporating tank and with the discharge connection of the header, the mixing chamber being provided with an outlet for the products of the apparatus.

4. In apparatus of the class described, the combination of a mixing chamber, an evaporating tank having a vapor outlet communicating with the mixing chamber, an ozone generator comprising a casing having an inlet for atmospheric air and enclosing the ozone generating elements and defining therewith a passage including the ozone generating space and a two-branch passageway communicating with the evaporating tank, one branch of which conducts the air flowing therethrough in heat exchanging relation to the ozone generating elements, means inducing a flow of atmospheric air inwardly through said inlet, valve-like means for apportioning the air between the two branches of said passageway, thermostatic means in heat receiving relation to the portion of the passageway adjacent the evaporating tank and operatively connected to and controlling said valve-like means to produce an air supply of proper temperature for the evaporating tank, and means for conducting ozonized air from said ozone generating space to the mixing chamber, said chamber having an outlet for the products of the apparatus.

5. In apparatus of the class described, the combination of a mixing chamber, an evaporating tank having a vapor outlet communicating with the mixing chamber, an ozone generator comprising a casing having an inlet for atmospheric air and enclosing opposed electrodes with dielectric material therebetween and spaced to provide an ozone generating passage between the active faces of the electrodes, the casing being provided with a fresh air passage supplied from said inlet and a part of the casing defining with the inactive face of one of the electrodes, a warm air passage similarly supplied and to which heat is imparted from said electrode, the fresh air passage and the warm air passage communicating with the evaporating tank, valve-like means operatively associated with the two last mentioned passages for controlling the proportions of fresh and warm air supplied to the evaporating tank, thermostatic means subjected to the temperature of the mixture of fresh and warm air and operatively connected to said valve-like means for actuating the latter, and means for conducting ozonized air from the ozone generating passage to the mixing chamber, said chamber having an outlet for the products of the apparatus.

6. A mixing chamber for the components of a vaporized ozonide comprising a casing, partitions dividing its interior into an ozone receiving compartment, a vapor receiving compartment, a compounding passage, and a commingling compartment, the casing having inlet openings for the ozone and vapor receiving compartments, the partition separating the compounding passage from the ozone and vapor receiving compartments having an opening, a deflector opposite said opening and defining the adjacent ends of the ozone and vapor receiving compartments, the partition separating the compounding passage from said commingling compartment having an opening adjacent its lower end, and a series of baffles in the commingling compartment, the casing having a discharge opening communicating with the top portion of the last mentioned compartment.

7. A mixing chamber for the components of a vaporized ozonide comprising a casing, partitions dividing its interior into an ozone receiving compartment, a vapor receiving compartment, a compounding passage and a commingling compartment, the casing having inlet openings for the ozone and vapor receiving compartments, said opening of the last mentioned compartment being located adjacent the bottom thereof, a dam rising from the bottom of the vapor receiving compartment in opposed relation to the vapor inlet opening, the partition that separates said ozone and vapor receiving compartments from the compounding passage having an opening above the horizontal plane of the top edge of said dam and a drain opening adjacent the bottom of the vapor receiving compartment, a deflector opposite the first mentioned opening of said partition and defining the adjacent ends of the ozone and vapor receiving compartments, a baffle disposed above the portion of the vapor receiving compartment wherewith the vapor inlet communicates and overhanging the dam, the partition that separates the compounding passage and the commingling compartment having an opening adjacent its lower end, and a series of baffles in the commingling compartment, the casing having a discharge opening communicating with the top portion of the last mentioned compartment.

8. A mixing chamber for the components of a vaporized ozonide comprising a vertically disposed elongated casing, partitions extending from top to bottom thereof dividing the interior of the casing into an ozone receiving compartment and a vapor receiving compartment therebelow, a compounding passage and a commingling compartment, the casing having an ozone inlet opening for the first mentioned compartment and a vapor inlet opening for the second mentioned compartment situated adjacent the bottom thereof, the partition separating the compounding passage from the ozone and vapor receiving compartments having a horizontal slot, a deflector opposite said slot and defining the adjacent ends of the ozone and vapor receiving compartments the partition separating the compounding passage from the commingling compartment having an opening adjacent its lower end, and a series of partitions arranged in zig-zag fashion within the commingling compartment, successive ones of which from and including the lowermost partition having one or more openings adjacent its lower edge, the topmost partition being perforated substantially throughout its area, the casing having an outlet opening communicating with the top portion of the commingling compartment.

9. A mixing chamber for the components of a vaporized ozonide comprising a vertically disposed elongated casing, partitions extending from top to bottom thereof dividing the interior of the casing into an ozone receiving compartment and a vapor receiving compartment therebelow, a compounding passage and a commingling compartment, the casing having an ozone inlet opening for the first mentioned compartment and a vapor inlet opening for the second mentioned compartment situated adjacent the bottom thereof, the partition separating the compounding passage from the ozone and vapor receiving compartments having a horizontal slot, a deflector opposite said slot and defining the adjacent ends of the ozone and vapor receiving compartments, the partition separating the compounding passage from the commingling compartment having an opening adjacent its lower end, a series of perforated partitions arranged in zig-zag fashion within the commingling compartment, the casing having an outlet opening communicating with the top portion of the commingling compartment, the first mentioned partition having a relatively small opening adjacent the bottom of the casing, a dam rising from the bottom of the vapor receiving compartment between the last mentioned opening and the vapor inlet opening, the casing having a drain opening in its bottom wall, and a drip cup removably supported with its mouth sealed about said opening.

10. Apparatus according to claim 3, wherein one of said walls is provided with venting means in the region of the junction of the passages on opposite sides of the adjacent electrode.

11. Apparatus according to claim 3, wherein each of said walls is provided with venting means in the region of the junction of the passages on opposite sides of the adjacent electrode.

12. In apparatus of the class described, the combination of a mixing chamber provided with an outlet for the products of the apparatus, an evaporating tank having a vapor outlet communicating with the mixing chamber, a casing having an air inlet and provided with an outlet for a part of the air supplied to the casing, the last mentioned outlet communicating with the evaporating tank, ozone generating elements situated within the casing and defining a passage for substantially the remaining part of the air supplied to the casing, said passage including the ozone generating space and having an outlet communicating with the mixing chamber.

LEE S. CHADWICK.

REFERENCES CITED

The following references are of record in the file of this patent:

UNITED STATES PATENTS

| Number | Name | Date |
|---|---|---|
| 205,201 | Morehouse | June 25, 1878 |
| 610,159 | Speer | Aug. 30, 1898 |
| 829,790 | Joseph | Aug. 28, 1906 |
| 955,818 | Lohman | Apr. 19, 1910 |
| 1,081,617 | Knox (B) | Dec. 16, 1913 |
| 1,086,373 | Knox (A) | Feb. 10, 1914 |
| 1,234,736 | Davidson | July 31, 1917 |
| 1,518,162 | Parkinson | Dec. 9, 1924 |
| 1,897,997 | Babcock | Feb. 21, 1933 |
| 2,058,723 | Rosenfeld | Oct. 27, 1936 |
| 2,243,053 | Ramage | May 20, 1941 |